United States Patent
Anders et al.

(10) Patent No.: US 7,177,315 B2
(45) Date of Patent: Feb. 13, 2007

(54) METHOD AND COMMUNICATIONS ARRANGEMENT FOR THE TRANSMITTING MULTIPLE DESTINATION DATA AND/OR RETRIEVABLE DATA IN A COMMUNICATIONS NETWORK

(75) Inventors: Jürgen Anders, Penzberg (DE); Thomas Gremmer, München (DE)

(73) Assignee: Siemens Aktiengesellschaft, Munich (DE)

( * ) Notice: Subject to any disclaimer, the term of this patent is extended or adjusted under 35 U.S.C. 154(b) by 1070 days.

(21) Appl. No.: 10/230,400

(22) Filed: Aug. 29, 2002

(65) Prior Publication Data

US 2003/0081616 A1    May 1, 2003

(30) Foreign Application Priority Data

Sep. 3, 2001 (DE) ................. 101 43 105

(51) Int. Cl.
  *H04L 12/28* (2006.01)
(52) U.S. Cl. ............... 370/396; 370/401; 370/390; 370/395.1
(58) Field of Classification Search ............... None
  See application file for complete search history.

(56) References Cited

U.S. PATENT DOCUMENTS

| | | | |
|---|---|---|---|
| 5,608,447 A | | 3/1997 | Farry et al. |
| 5,818,511 A | | 10/1998 | Farry et al. |
| 6,345,051 B1 * | | 2/2002 | Gupta et al. ............. 370/395.2 |
| 6,493,348 B1 * | | 12/2002 | Gelman et al. ............ 370/401 |
| 6,529,479 B1 * | | 3/2003 | Suzuki .................... 370/236.1 |
| 6,751,218 B1 * | | 6/2004 | Hagirahim et al. ........ 370/390 |
| 6,765,910 B1 * | | 7/2004 | Johnson .................. 370/394 |
| 6,775,271 B1 * | | 8/2004 | Johnson et al. ........... 370/352 |
| 6,788,696 B2 * | | 9/2004 | Allan et al. .............. 370/411 |
| 6,829,250 B2 * | | 12/2004 | Voit et al. ................ 370/467 |
| 6,904,054 B1 * | | 6/2005 | Baum et al. .............. 370/467 |
| 7,042,880 B1 * | | 5/2006 | Voit et al. ................ 370/395.1 |
| 2003/0035378 A1 * | | 2/2003 | Nguyen et al. ............ 370/250 |

FOREIGN PATENT DOCUMENTS

WO     WO 02/34003     4/2002

OTHER PUBLICATIONS

FS-VDSL Working Group: "System Architecture Specification," Full Service-VDSL Committee, 'Online!Jun. 5, 2003, pp. 1-44, CP002263398.

(Continued)

*Primary Examiner*—Bob A. Phunkulh
(74) *Attorney, Agent, or Firm*—Morrison & Foerster LLP

(57) ABSTRACT

A method and communications arrangement for transmitting multiple destination data and/or retrievable data in a communications network is provided in which several connections for transmitting multiple destination data are linked up with a decentralized distribution device having several subscriber connections. Accordingly, at least one of the connections can be selected using the distribution device, individually per subscriber connection, and multiple destination data transmitted by way of the selected connection is sent to the respective subscriber connection. Several additional connections to a retrieval device, which makes the retrievable data available, are linked up to the distribution device. Accordingly, transmission resources available on the subscriber side can be assigned as needed, regardless of the type of service currently being requested, and can subsequently be released again.

14 Claims, 1 Drawing Sheet

OTHER PUBLICATIONS

W. Fenner, "RFC 2236. Internet Group Management Protocol, Version 2," IETF Internet Engineering Taskforce, Nov. 30, 1997, pp. 1-24, CP002230720.

"ExpressLink Broadband Access with xDSL-Technology" Siemens AG; 2000, Information and Communication Networks, pp. 8-9.

"ExpressLink Broadband your horizons" Siemens AG; 2000, Information and Communication Networks.

"Full Service Access Network Requirements Specification" J. A. Quayle; Version Aug. 18, 1998.

"VDSL System Architecture Specification" FS0052, Revision 0.5 (Draft) Aug. 2001.

"Architecture Expert Group Contribution" FS0129, Rev. 2, Aug. 2001.

* cited by examiner

METHOD AND COMMUNICATIONS ARRANGEMENT FOR THE TRANSMITTING MULTIPLE DESTINATION DATA AND/OR RETRIEVABLE DATA IN A COMMUNICATIONS NETWORK

CLAIM FOR PRIORITY

This application claims priority to Application No. 10143105.8 which was filed in the German language on Sep. 3, 2001.

TECHNICAL FIELD OF THE INVENTION

This invention relates to optimizing the utilization of transmission resources available on the subscriber connection line when providing interactive services.

BACKGROUND OF THE INVENTION

In current communications networks, several decentralized communications devices, or each of several communications terminals connected with the decentralized communications devices by way of network termination devices, are connected with a parent communications network by way of one or more subscriber connection networks or subscriber access networks, also called ACCESS networks.

In the subscriber access networks, as well as in the parent communications networks, various transmission methods, such as ATM, SDH, PDH, Frame Relay, Ethernet or a combination of these transmission methods, can be used to transmit data.

Subscriber access networks are specifically designed for connecting or allowing subscriber access to parent communications networks, and have interfaces to existing transmission media or special access interfaces designed for high-bit-rate data traffic. Different types of access technologies are used to connect subscribers to subscriber access networks, such as:

connections by way of copper double leads,
connections by way of cable television lines,
connections by way of passive optical networks (PON),
connections by way of active optical networks (AON),
wireless connection networks; i.e., mobile phone systems.

In the home sector, the copper double lead is often already present. With a corresponding connection technology, these double leads can be utilized for connecting subscribers using high transmission rates, for example, ATM subscribers. Specifically, in this connection, both asymmetrical and symmetrical (digital) transmission methods that have a high bandwidth in the direction of the subscriber are used, ADSL, UDSL, VDSL and SDSL, for example. Such transmission methods are also called xDSL transmission methods. Distribution services, also called "broadband services," in particular multimedia distribution services, for example radio and television, as well as retrievable services, also called "interactive services," for example "video on demand" (VOD) or broadband Internet communication, for example video conferencing, can be implemented using such connection systems. The use of xDSL transmission methods to connect subscribers to the subscriber access network is described in the reference as "Xpress-Link—Broadband Access with xDSL Technology," Siemens AG, 2000, Information and Communication Networks, D-81359 Munich—pages 8 and 9, as an example.

Broadband subscriber access by way of subscriber access networks is described in the reference as "Xpresslink—Broaden your horizons," Siemens AG, 2000, Information and Communication Networks, Hofmannstrasse 51, D-81359 Munich, Order No. 850001-N8-P60-2-7600. On pages 9 and 10, the structure of a broadband subscriber access network is shown as an example. The subscriber access network shown has several decentralized communication devices, each of which has multiplexer and/or concentrator properties, also called DSLAM, to which one or more subscribers are connected by way of network termination devices, also called NT. Any data traffic that comes from subscribers is brought together, i.e., concentrated, by the respective decentralized communications device and sent to the parent communications network, here an ATM backbone, by way of a uniform interface and, if necessary, by way of a central access device, here an ATM access.

In order to implement the broadest possible spectrum of broadband services and interactive services by way of subscriber access networks, efforts are underway, as part of an initiative called the "FSAN, Full Service Access Network," to find a generally valid consensus for defining basic requirements on the basis of which broadband subscriber access networks are expected to be introduced over large areas. The definition of the basic requirements is described, for example, in the reference "Full Service Access Network Requirements Specification," J. A. Quayle, version dated Aug. 18, 1998 (http://www.laps.bt.com/profsoc/access/).

An FSAN network architecture, particularly within the scope of VDSL transmission systems, is described in the following references:

"VDSL System Architecture Specification," FS0052, revision 0.5 (draft), August 2001;

Architecture Expert Group Contribution, FS0129, revision 2, August 2001.

The implementation of distribution services by way of subscriber access networks, for example the distribution of multimedia data, e.g., video broadcasts (broadcast TV services) or video on demand (VOD services), is known to persons skilled in the art. A network architecture arranged on the subscriber connection side is shown, as an example, on page 14 of the aforementioned reference "Full Service Access Network Requirements Specification." The data stream containing both broadband data and narrow-band data linked up to the subscriber by way of the subscriber connection network is first sent to a splitter. The splitter divides the incoming data stream into a broadband data stream, for example a broadband multimedia or video data stream, and a narrow-band data stream, to implement a telephone service. The broadband video data stream is sent to a corresponding broadband network termination device. Several communications terminals, such as set-top boxes, as well as a personal computer, are connected with the broadband network termination device by way of a home network, or Broadband Home Network, installed at the subscriber's location.

Since every set-top box must provide both broadcast TV services and also video-on-demand services, in the case of ATM networks, for example, every set-top box is connected with the broadband termination device by way of two permanently established virtual connections, or Permanent Virtual Connections (PVCs). Each of these connections must be configured for the transmission of multimedia data according to current video standards, e.g., MPEG2, with a transmission rate of 4 to 6 Mbit/s. Thus the broadband network termination device is connected to each decentralized communications device by way of four permanently established virtual connections.

In current ATM communications networks, the individual ATM connections are configured differently depending on the type of service to be implemented in each instance. To implement an interactive service such as video on demand, for example, a permanent virtual connection, VCC (Virtual Channel Connection), is passed from the network termination device NT on the subscriber side by way of the decentralized communications device, hereinafter called a distribution device, and, if necessary, by way of an ATM-Cross-Connect to a VOD server arranged in the parent ATM communications network. The end points of these virtual connections are arranged in the network termination device NT on the subscriber side and in the video server.

In order to implement a broadband service such as a broadcast TV service, for example (which can be installed in addition to an already established interactive service), one or more permanent virtual connections are passed from the broadband network termination device NT on the subscriber side, by way of the subscriber connection line, to the decentralized communications device, i.e., distribution device. In addition, the distribution device is connected, on the network side, with a multiple destination source, i.e., broadcast video source, also called a digital head unit, arranged centrally in the communications network by way of several permanent virtual connections with multimedia data streams (e.g., TV channels) being linked up to the distribution device by way of each of the virtual connections. Using a signaling method implemented between the broadband network termination device, i.e., set-top box and distribution device, for example by means of the standardized IGMP protocol (described in the reference IGMP V2, RFC 2236), the subscriber can select one of the multimedia data streams being linked up in a subscriber-specific manner. This causes the distribution device to send the selected data stream to the broadband network termination device, i.e., to the set-top box in question, by way of one of the permanent virtual connections.

The network architecture on the subscriber side, as described, has the disadvantage that in order to provide interactive services, such as video on demand, a permanent virtual connection for each subscriber has to be established between the broadband network termination device on the subscriber side and the VOD server by way of the distribution device; in other words, a certain amount of transmission resources on the subscriber connection line must be reserved for this service. When the interactive service is not being utilized, the transmission resources reserved on the subscriber connection line between the network termination device and the distribution device are being wasted.

SUMMARY OF THE INVENTION

The invention is based on the task of optimizing the utilization of transmission resources available on the subscriber connection line when providing interactive services.

In an aspect of the invention, for transmitting multiple destination and/or retrievable data in a communications network, several connections for transmitting multiple destination data are linked up to a decentralized distribution device having several subscriber connections. Using the distribution device, at least one of the connections can be selected individually by a subscriber connection, with the multiple destination data linked up by way of the selected connection being sent to the respective subscriber connection. The essential aspect of the method, according to the invention, consists of several additional connections that are linked up to the distribution device by a retrieval device that makes the retrievable data available. At least one of the additional connections is selected individually by a subscriber connection. After the selection of the additional connection, at least part of the retrievable data is requested individually by the subscriber connection, with the requested part of the retrievable data being sent to the requesting subscriber connection by the retrieval device by way of the selected connection and the distribution device.

The significant advantage of the method, according to an aspect of the invention, includes the fact that permanently reserving transmission resources on the subscriber connection side, for example on the subscriber connection line, is no longer required to provide interactive services to the subscriber in question. It is advantageous that available transmission resources on the subscriber connection line can be assigned as needed, regardless of the type of service actually being requested, and subsequently can be released again.

According to another aspect of the invention, a communications arrangement for transmitting multiple destination data and/or retrievable data is provided.

DETAILED DESCRIPTION OF THE INVENTION

Figure 1:
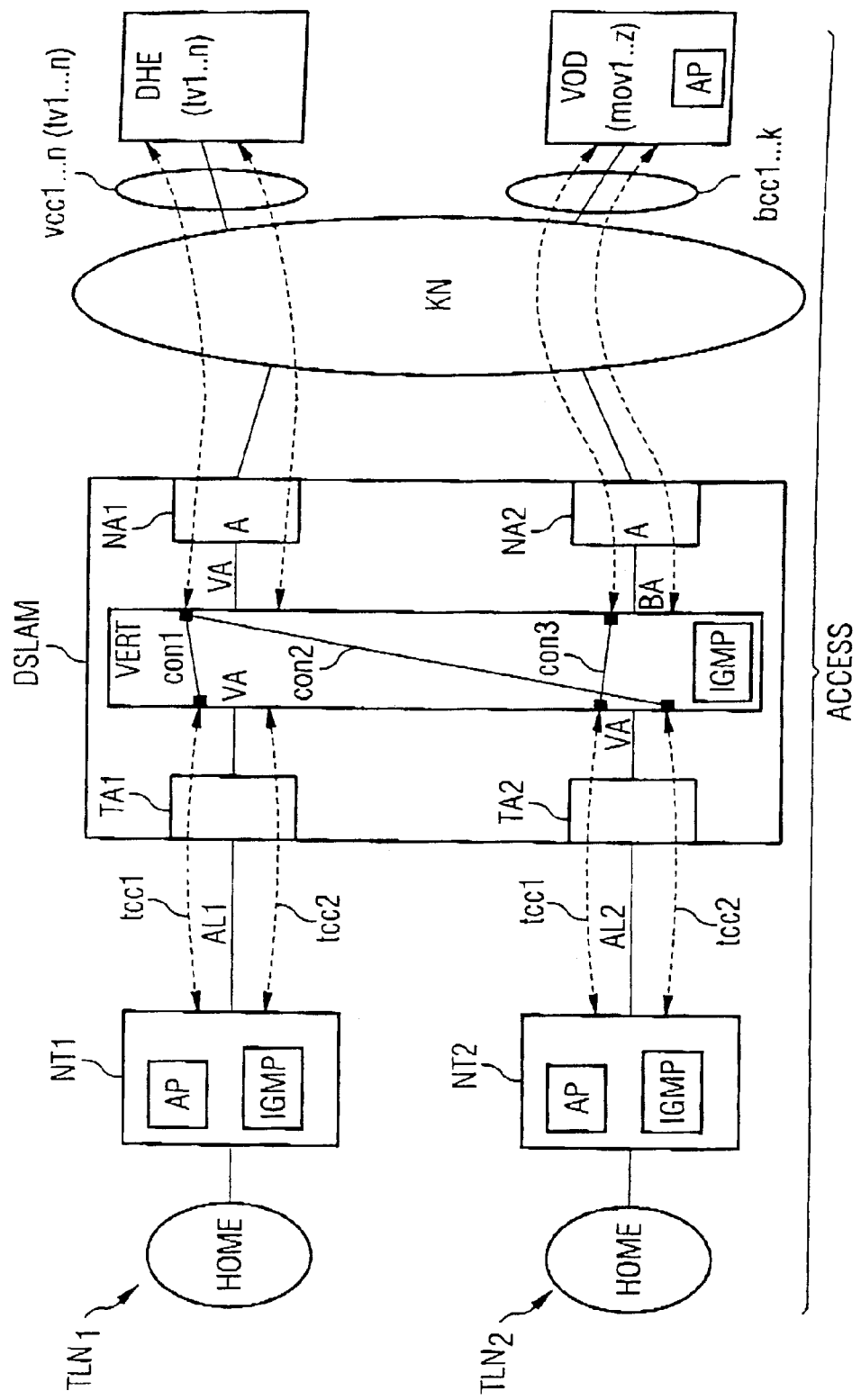
FIG. 1 shows two network termination devices assigned to respective subscribers connected with a parent communications network by way of a subscriber access network according to the invention.

FIG. 1 shows two network termination devices NT1 and NT2, each assigned to a subscriber TLN1 or TLN2, respectively, which are connected with a parent communications network KN by way of a subscriber access network ACCESS. The parent communications network KN is structured according to the Asynchronous Transfer Mode (ATM), for example. Additional access units, for example a broadband remote access server BRAS as well as a service selection server SSS, not shown, can be arranged in the parent communications network KN, making a transition possible, for example, to an Internet protocol or IP-oriented communications network for providing IP-based services. Furthermore, a digital head station DHE is connected with the parent communications network KN, allowing the feed of several unidirectional video data streams tv1 . . . n into the parent communications network KN. Furthermore, a video server VOD is connected to the parent communications network KN, which has a server that stores several retrievable data mov1 . . . k, for example various retrievable movies, for the purpose of implementing the bidirectional service "video on demand."

Communications terminals, such as set-top boxes or personal computers, not shown, are connected with the two network termination devices NT1 and NT2, respectively, by way of a communications network HOME on the subscriber side. The network termination devices NT1 and NT2 are each connected by way of a subscriber connection line AL with a subscriber connection TA1 or TA2 of a decentralized communications device DSLAM arranged in the subscriber access network ACCESS. In this exemplary embodiment, the decentralized communications device DSLAM is structured as a digital access multiplexer—Digital Subscriber Line Access Multiplexer—by which the data traffic directed from or to the subscribers is concentrated, or multiplexed. The individual subscriber connections TA1 and TA2, in connection with each connection line AL connected with them, are structured in accordance with an xDSL transmission method provided for high-bit-rate data transmission. Examples of such transmission methods are ADSL, SDSL and VDSL.

The decentralized communications device DSLAM is connected with the parent communications network KN by way of two network connections, NA1 and NA2. A distribution device, which is connected with one of the two network connections NA1 and 2 by way of a connection, UA or BA, is arranged in the decentralized communications device DSLAM. The distribution device VERT is connected with subscriber connections TA1 and TA2 by way of two additional connections VA.

In order to implement the broadband service or broadcast TV service, n permanent virtual connections vcc1 . . . n between the first network connection NA1 of the decentralized communications device DSLAM and the digital head station DHE are established by way of the communications network KN. These virtual connections vcc1 . . . n can be configured as unidirectional connections, in which each unidirectional video data stream tv1 . . . n is transmitted to the decentralized communications device DSLAM, or to the distribution device VERT arranged in it, as illustrated by double arrows. In addition to the implementation of the interactive VOD service, there are k additional permanent virtual connections established between the second network termination NA2 of the decentralized communications device DSLMA, or the distribution device VERT, and the VOD server, as illustrated by double arrows, which are configured as bi-directional virtual connections.

On the subscriber side, two permanent virtual connections tcc1 and tcc2 are established between each network termination device NT1 and NT2 and the subscriber connection TA1 or TA2 connected with them by way of the subscriber connection line AL1 or AL2; i.e., the distribution device VERT, as illustrated by double arrows. For example, one of the virtual connections tcc1 or tcc2 on each subscriber connection line AL1 or AL2 is provided for implementing the broadcast TV service, and the other virtual connection, tcc1 or tcc2, is provided for implementing the interactive VOD service.

Means for implementing a suitable selection method IGMP—for example the IGMP protocol—are arranged in the individual network termination devices NT1 and NT2 and the distribution device VERT, in each instance, by means of which a subscriber can select a connection vcc1 . . . n linked up to the distribution device VERT or a video data stream tv1 . . . n transmitted by way of this connection, which is subsequently sent to the network termination device NT1 or NT2 of the selecting subscriber by way of the distribution device VERT and by way of a free virtual connection tcc1 or tcc2 of the subscriber connection line AL. In accordance with the exemplary embodiment shown in FIG. 1, both the first subscriber and the second subscriber, TLN1 and TLN2, have selected the video data stream tv1 that is being transmitted to the distribution device VERT by way of the first virtual connection vcc1, this data stream being sent to the respective subscriber, TLN1 or TLN2, by way of the first subscriber-side virtual connection tcc1 of the first subscriber line AL1 and by the second subscriber-side connection tcc2 of the second subscriber line AL2, in parallel, using a multicast or broadcast transmission method shown in FIG. 1 by the links con 1 and 2.

According to the invention, for example, the second subscriber TLN2 can select one of the other bidirectional virtual connections linked up to the distribution device VERT, bcc1 in this instance, within the framework of the IGMP protocol, whereupon the other connection selected, bcc1, is connected with the virtual connection that is currently free on the subscriber side, tcc1 in this instance, by the distribution device VERT on the second connection line AL2, as illustrated by the link con 3. After a continuous virtual connection to the video server VOD arranged in the communications network has been established in this manner between the second network termination device NT2 by way of the decentralized communications device DSLAM, the second subscriber can select the desired data, for example a certain movie mov1, by means of a suitable request procedure, for example using a standardized selection protocol AP installed in the first network termination device NT1 and in the video server VOD. The selected movie mov1 is then transmitted to the second network termination device NT2 as a video data stream by way of the virtual connection that has been switched through.

A switchover by the subscriber between unidirectional broadcast TV services and bidirectional, i.e., interactive services, according to the invention, can also occur, for example, by using special, generally known IP multicast addresses. As already explained, by switching over from a broadcast TV service to an interactive service, the virtual connection tcc1 or 2 provided for this purpose on the subscriber connection line AL1 or AL2 is connected with a currently free bidirectional virtual connection bcc1 . . . k established between the decentralized communications device DSLAM and the video server VOD.

Because of the method, according to the invention, it is no longer necessary to permanently reserve transmission resources available on the subscriber connection line to implement interactive services so that transmission resources can be saved.

Taking into account aspects of traffic theory, additional transmission resources can be saved in that the number k of permanent bidirectional virtual connections bcc1 . . . k established between the decentralized communications device DSLAM and the video server VOD is less than the number of network termination devices NT1 and NT2 connected with the decentralized communications device DSLAM by way of the subscriber lines. In such a network configuration, however, the number of subscribers ordering a movie, for example, may be greater than the number of virtual connections bcc1 . . . k established between the decentralized communications device DSLAM and the VOD server.

However, in this case, it is necessary that if all the bidirectional virtual connections BVC1 . . . k established between the decentralized communications device DSLAM and the video server VOD are busy, a corresponding feedback message is sent to the requesting subscriber. It should be noted that within the framework of the IGMP protocol, no feedback messages to the subscriber are possible. IGMP would therefore have to be expanded, or a different selection method or selection protocol that allows feedback messages would have to be created.

The invention claimed is:

1. A method for transmitting multiple destination data and/or retrievable data in a communications network in which several connections are linked together to transmit multiple destination data to a decentralized distribution device having several subscriber connections, comprising:

selecting at least one of the connections per individual subscriber connection using the distribution device; and sending the multiple destination data linked up to the subscriber connection, in each case, by way of the selected connection, wherein several additional connections of a retrieval device that make available retrievable data are linked up to the distribution device, per individual subscriber connection, at least one of the additional connections is selected, after selection of the additional connection, at least part of the retrievable data is requested per individual subscriber connection, and the requested part of the retrievable data is sent from the retrieval device to the requesting subscriber connection by way of the selected connection and the distribution device.

2. The method according to claim 1, wherein the selection of the at least one additional connection per individual subscriber connection takes place using an IGMP protocol.

3. The method according to claim 1, wherein the request of at least part of the retrievable data made available by the retrieval device upon request by the individual subscriber connection takes place within the framework of a selection protocol that has been implemented between the subscriber assigned to each subscriber connection and the distribution device.

4. The method according to claim 1, wherein the data transmitted to at least one subscriber connection is transmitted to the subscriber assigned to the subscriber connection using an xDSL transmission method.

5. The method according to claim 1, wherein the communications network is structured in accordance with a communications network corresponding to the synchronous or plesiochronic, digital hierarchy, or as a passive optical communications network, and/or as a packet-oriented and/or cell-oriented communications network.

6. The method according to claim 5, wherein at least one communications network is structured in accordance with the Asynchronous Transfer Mode or according to Frame Relay or as a communications network in conformity with TCP/IP or Ethernet, or as a combination of at least part of these communications networks.

7. The method according to claim 1, wherein if none of the additional connections can currently be selected, a corresponding feedback message is sent to the subscriber.

8. The method according to claim 1, wherein several connections for transmitting multiple destination data and/or retrievable data sent to the subscriber connection, in each instance, are established between the subscriber connection and the respective subscriber assigned thereto.

9. A communications arrangement for transmitting multiple destination data and/or retrievable data in a communications network, comprising:

a decentralized distribution device having several subscriber connections;

a multiple destination transmission device connected to the decentralized distribution device by way of several connections for transmitting multiple destination data;

selection means assigned to the distribution device for selection of at least one of the connections individually per subscriber connection, the distribution device being structured so that the multiple destination data linked up by way of the selected connection is sent to the respective subscriber connection, the selection means being structured so that per individual subscriber connection, at least one of the additional connections can be selected by the subscriber;

a retrieval device that makes the retrievable data available connected with the decentralized distribution device by way of several additional connections; and retrieval means in the retrieval device for requesting at least part of the retrievable data individually per subscriber connection, wherein the retrieval device and the distribution device are structured so that the requested part of the retrievable data is transmitted from the retrieval device to the requesting subscriber connection by way of the selected additional connection and the distribution device.

10. The communications arrangement according to claim 9, wherein the subscriber connections are each connected with a network termination device by way of a subscriber connection line, and additional connections are established between the network termination device and the distribution device by way of the respective subscriber connection line for transmitting multiple destination data and retrievable data.

11. The communications arrangement according to claim 9, wherein the subscriber connections, the subscriber connection lines and the network termination devices are structured for the implementation of an xDSL transmission method.

12. The communications arrangement according to claim 9, wherein the communications network is structured in accordance with a communications network corresponding to the synchronous or plesiochronic, digital hierarchy, or as a passive optical communications network, and/or as a packet-oriented and/or cell-oriented communications network.

13. The communications arrangement according to claim 12, wherein at least one communications network is structured in accordance with the Asynchronous Transfer Mode or according to Frame Relay or as a communications network in conformity with TCP/IP or Ethernet, or as a combination of at least part of these communications networks.

14. The communications arrangement according to claim 9, wherein the number of additional connections linked up to the distribution device is greater than the number of network termination devices connected to the distribution device, and the selection means are structured so that if no additional connections are available, a corresponding feedback message is transmitted to the network termination device.

* * * * *